US011092706B1

(12) United States Patent
Ding et al.

(10) Patent No.: US 11,092,706 B1
(45) Date of Patent: Aug. 17, 2021

(54) PHYSICAL SEISMIC SIMULATION TEST APPARATUS AND METHOD BASED ON REFLECTED WAVE FIELD FOR HYDRATE FORMATION

(71) Applicant: China University of Petroleum (Beijing), Beijing (CN)

(72) Inventors: Pinbo Ding, Beijing (CN); Jianxin Wei, Beijing (CN); Bangrang Di, Beijing (CN); Feng Zhang, Beijing (CN); Lianbo Zeng, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 17/153,549

(22) Filed: Jan. 20, 2021

(30) Foreign Application Priority Data

Jul. 20, 2020 (CN) .......................... 202010697733.0

(51) Int. Cl.
*G01V 1/30* (2006.01)
*G01V 1/28* (2006.01)

(52) U.S. Cl.
CPC ................ *G01V 1/282* (2013.01); *G01V 1/30* (2013.01); *G01V 2210/60* (2013.01)

(58) Field of Classification Search
CPC ....... G01V 1/282; G01V 1/30; G01V 2210/60
See application file for complete search history.

(56) References Cited

U.S. PATENT DOCUMENTS 9,897,529 B2 * 2/2018 Xing .................... G01N 33/241
10,900,945 B2 * 1/2021 Hakimuddin ........ G01N 33/241
(Continued)

FOREIGN PATENT DOCUMENTS

CN   105334546 A   2/2016
CN   105464635 A   4/2016
(Continued)

OTHER PUBLICATIONS

Research and Prospect of New Petroleum Geophysical Prospecting Technology in China (2012).

*Primary Examiner* — Krystine E Breier
(74) *Attorney, Agent, or Firm* — Volpe Koenig

(57) ABSTRACT

The present invention belongs to the field of geophysical exploration, and discloses physical seismic simulation test apparatus and method based on reflected wave field for a hydrate formation. The apparatus comprises a hydrate preparation device and a reflected acoustic wave test device, wherein the hydrate preparation device is configured to generate simulated hydrates, and the reflected acoustic wave test device is configured to continuously emit ultrasonic waves to the simulated hydrates in the generation process, process the received reflected waves to identify and extract reflection characteristic information and acoustic wave velocity change information, and continuously monitor the degree of saturation of the simulated hydrates at the same time to obtain a corresponding relationship between the reflection characteristic information and acoustic wave velocity change information and the degree of saturation of the simulated hydrates. The apparatus and method provided by the present invention obtain the reflection characteristics of a hydrate formation and acoustic wave velocity change by acquiring the reflected wave field of the hydrate formation, thereby obtain the relationship with the degree of saturation of the hydrates, and have important guiding significance for interpretation of the offshore seismic exploration data of natural gas hydrates and estimation of the degree of saturation of natural gas hydrates.

6 Claims, 3 Drawing Sheets

(56) References Cited

U.S. PATENT DOCUMENTS

| | | | |
|---|---|---|---|
| 2006/0155475 A1 | 7/2006 | Yin | |
| 2016/0357888 A1* | 12/2016 | Li | E21B 43/34 |
| 2017/0101853 A1* | 4/2017 | Gao | G01N 33/225 |
| 2020/0340973 A1* | 10/2020 | Hakimuddin | G01N 29/024 |

FOREIGN PATENT DOCUMENTS

| | | |
|---|---|---|
| CN | 106291659 A | 1/2017 |
| CN | 106556687 A | 4/2017 |
| CN | 109100796 A | 12/2018 |

\* cited by examiner

PHYSICAL SEISMIC SIMULATION TEST APPARATUS AND METHOD BASED ON REFLECTED WAVE FIELD FOR HYDRATE FORMATION

CROSS REFERENCE

The present application claims for the benefits of the Chinese Patent Application No. 202010697733.0 filed on Jul. 20, 2020, the content of which is incorporated here by reference.

TECHNICAL FIELD

The present invention belongs to the field of geophysical exploration, and particularly relates to physical seismic simulation test apparatus and method based on reflected wave field for a hydrate formation.

BACKGROUND

The natural gas hydrates in epicontinental seabed have been confirmed by seismic technology, and Bottom Simulating Reflector (BSR) has become an important basis for explaining the existence of natural gas hydrates. The BSR is a negative polarity reflector basically parallel to the sub-bottom reflector and located at the depth of several hundred meters in the seabed, corresponding to the bottom of the hydrate stability zone. From the point of view of acoustic wave impedance, BSR represents a stratigraphic combination in which a high impedance layer resulted from natural gas hydrates covers a low impedance layer resulted from free gas. The difference in the seismic response characteristics of a hydrate-bearing formation is an important basis for identifying hydrates.

In the prior art, an acoustic wave reflection method is used in the actual offshore exploration of natural gas hydrates, while an acoustic wave pulse transmission method is usually used in the acoustic wave tests in experimental simulation of hydrates, and there is some difference between the measurement results obtained with the two methods.

At present, the reflected wave field simulation is mainly carried out by means of numerical simulation, and no effective solution has been proposed for the experimental simulation method, because natural gas hydrate rock cores are required for the physical seismic experimental simulation method for hydrates but the natural gas hydrate rock cores in the sea areas are highly fragile, difficult to obtain and costly.

SUMMARY

The object of the present invention is to provide physical seismic simulation test apparatus and method based on reflected wave field for a hydrate formation, which obtain the reflection characteristics of a hydrate formation and acoustic wave velocity change by acquiring the reflected wave field of the hydrate formation, thereby obtain the relationship with the degree of saturation of the hydrates, and have important guiding significance for interpretation of the offshore seismic exploration data of natural gas hydrates and estimation of the degree of saturation of natural gas hydrates.

To attain the above object, in a first aspect, the present invention provides a physical seismic simulation test apparatus based on reflected wave field for a hydrate formation, which comprises a hydrate preparation device and a reflected acoustic wave test device, wherein the hydrate preparation device is configured to generate simulated hydrates, and the reflected acoustic wave test device is configured to continuously emit ultrasonic waves to the simulated hydrates in the generation process, process the received reflected waves to identify and extract reflection characteristic information and acoustic wave velocity change information, and continuously monitor the degree of saturation of the simulated hydrates at the same time to obtain a corresponding relationship between the reflection characteristic information and acoustic wave velocity change information and the degree of saturation of the simulated hydrates.

Furthermore, the hydrate preparation device comprises a temperature-adjustable cryogenic box, a pressure kettle, a physical seismic model and a methane gas supply device; the pressure kettle is disposed in the cryogenic box, the seismic physical model is arranged in the pressure kettle, and the methane gas supply device is in communication with the physical seismic model. The pressure kettle may be in a removable and movable form to facilitate the handling in the cryogenic box.

Furthermore, the seismic physical model comprises a top plate, a simulated hydrate formation and a bottom reflecting plate, wherein the simulated hydrate formation is disposed between the top plate and the bottom reflecting plate, and the distance between the top plate and the bottom reflecting plate is adjustable; a gas supply pipe of the methane gas supply device sequentially penetrates through a bottom cover of the pressure kettle and the bottom reflecting plate to charge methane into the simulated hydrate formation. The top plate simulates a top water-bearing zone of the hydrate formation or hydrate deposit in the ocean, while the bottom reflecting plate simulates a bottom water-bearing zone of the hydrate formation or hydrate deposit in the ocean; the distance between the top plate and the bottom reflecting plate is determined by the height of the simulated hydrate formation, so that the top of the simulated hydrate formation contacts with the top plate and the bottom of the simulated hydrate formation contacts with the bottom reflecting plate finally.

Furthermore, the reflected acoustic wave test device comprises an ultrasonic transducer array and a multi-channel acoustic test device; the ultrasonic transducer array is configured integrally with the top cover of the pressure kettle and disposed on the top surface of the physical seismic model, and the distance between the ultrasonic transducer array and the physical seismic model is adjustable; each transducer unit of the ultrasonic transducer array is connected in two-way to the multi-channel acoustic test device respectively. The spacing between the ultrasonic transducer array and the physical seismic model is 0-65 mm. When the spacing varies, the reflection angle of the acoustic waves emitted by the same transducer unit is different when it is received by another identical transducer unit, and the amplitude of the resulting reflected wave field varies. Thus, the physical and chemical characteristics in the physical seismic model can be analyzed more comprehensively according to different reflected wave fields.

Furthermore, the multi-channel acoustic test device comprises a multi-channel pre-amplifier, a multi-channel transceiver and a computer, wherein one end of the multi-channel transceiver is electrically connected to the ultrasonic transducer array via the multi-channel pre-amplifier, and the other end of the multi-channel transceiver is electrically connected to the computer; the multi-channel transceiver has a single-input and multi-output operating mode. The number of channels of the multi-channel pre-amplifier matches that of the multi-channel transceiver. The multi-channel transceiver comprises a transmitter and three receivers, the multi-channel pre-amplifier comprises a transmitted signal amplifier and three received signal amplifiers, the transmitted signal amplifier is connected via a multiplexer to the ultrasonic transducer array, and the output signals from the transmitted signal magnifier are connected to the transducer units sequentially under program control; the signal output side of the transmitter is connected to the transmitted signal amplifier, the ultrasonic signals outputted by the transmitter is amplified by the transmitted signal magnifier and then is emitted; the reflected wave signals detected by every three transducer units are amplified by the three received signal amplifiers respectively simultaneously and received by the three receiver simultaneously, transformed into electrical signals, and then transmitted to the computer. The computer performs signal processing and analysis and parses the physical and chemical characteristics of the physical seismic model from the signals.

Furthermore, the multi-channel transceiver works in a mode in which it transmits in a single channel and scans and receives in longitudinal and transverse directions sequentially in three channels; accordingly, the ultrasonic transducer array transmits with a single transducer unit in turn, while the other transducer units receive the reflected waves at the same time, wherein among the transducer units that receive the reflected waves, three adjacent transducer units in the same column work as a group to sequentially feed echo signals back to the multi-channel transceiver.

Furthermore, the top cover of the pressure kettle is adapted to be adjusted up and down by means of a piston. Specific pressure and temperature are required to generate simulated hydrates. The pressure in the reaction kettle may be controlled by adjusting the height of the piston or discharging gas through the piston.

Furthermore, the methane gas supply device comprises a methane cylinder and a booster pump, and the methane outputted by the methane cylinder is sent to the physical seismic model after being regulated by the booster pump.

In a second aspect, the present invention provides a physical seismic simulation test method based on reflected wave field for a hydrate formation, which comprises the following steps: (1) placing a physical seismic model for simulating the submarine gas hydrate generation environment in a pressure kettle; (2) adjusting the temperature and pressure in the pressure kettle to preset values, so that simulated hydrates are generated in the physical seismic model; continuously emitting ultrasonic waves for simulating seismic waves to the simulated hydrates in the generation process at the same time; (3) receiving reflected wave signals from the physical seismic model, identifying and extracting reflection characteristic information and acoustic wave velocity change information from the received reflected wave signals, and continuously monitoring the degree of saturation of the simulated hydrates at the same time to obtain a corresponding relationship between the reflection characteristic information and acoustic wave velocity change information and the degree of saturation of the simulated hydrates.

Furthermore, the ultrasonic waves are transmitted in a single channel, while the reflected waves are scanned and received in longitudinal and transverse directions sequentially in three channels.

With the above technical scheme, the apparatus and method provided by the present invention obtains the reflection characteristics of the hydrate formation and the acoustic wave velocity change by acquiring the reflected wave field of the hydrate formation, and thereby obtains a relationship with the degree of saturation of the hydrates. Those research results have important guiding significance for the interpretation of offshore seismic exploration data of gas hydrates and estimation of the degree of saturation of gas hydrates.

Other features and advantages of the present invention will be further detailed in the embodiments hereunder.

| Reference Numbers | |
|---|---|
| 1 - cryogenic box | 2 - pressure kettle |
| 21 - top cover | 22 - main body part |
| 23 - bottom cover | 24 - fixed end |
| 25 - piston | 26 - piston rod |
| 27 - valve | 3 - physical seismic model |
| 31 - top plate | 32 - simulated hydrate formation |
| 33 - bottom reflecting plate | 4 - methane gas supply device |
| 41 - methane cylinder | 42 - booster pump |
| 43 - low pressure storage tank | 44 - mute air compressor |
| 45 - high pressure storage tank | 51 - ultrasonic transducer array |
| 52 - multi-channel acoustic test device | 53 - multi-channel pre-amplifier |
| 54 - multi-channel transceiver | 55 - computer |

DETAILED DESCRIPTION

Hereunder some embodiments of the present invention will be detailed with reference to the accompanying drawings. It should be understood that the embodiments described herein are only provided to describe and explain the present invention rather than constitute any limitation to the present invention.

Firstly, it should be noted: in the following description of the technical scheme of the present invention, the orientation or position relations indicated by the terms "top", "bottom", "left", "right", etc., are based on the orientation or position relations indicated in the accompanying drawings. They are used only to ease and simplify the description of the present invention, rather than indicating or implying that the involved device or component must have a specific orientation or must be constructed and operated in a specific orientation. Therefore, the use of these terms shall not be deemed as constituting any limitation to the present invention.

Figure 1:
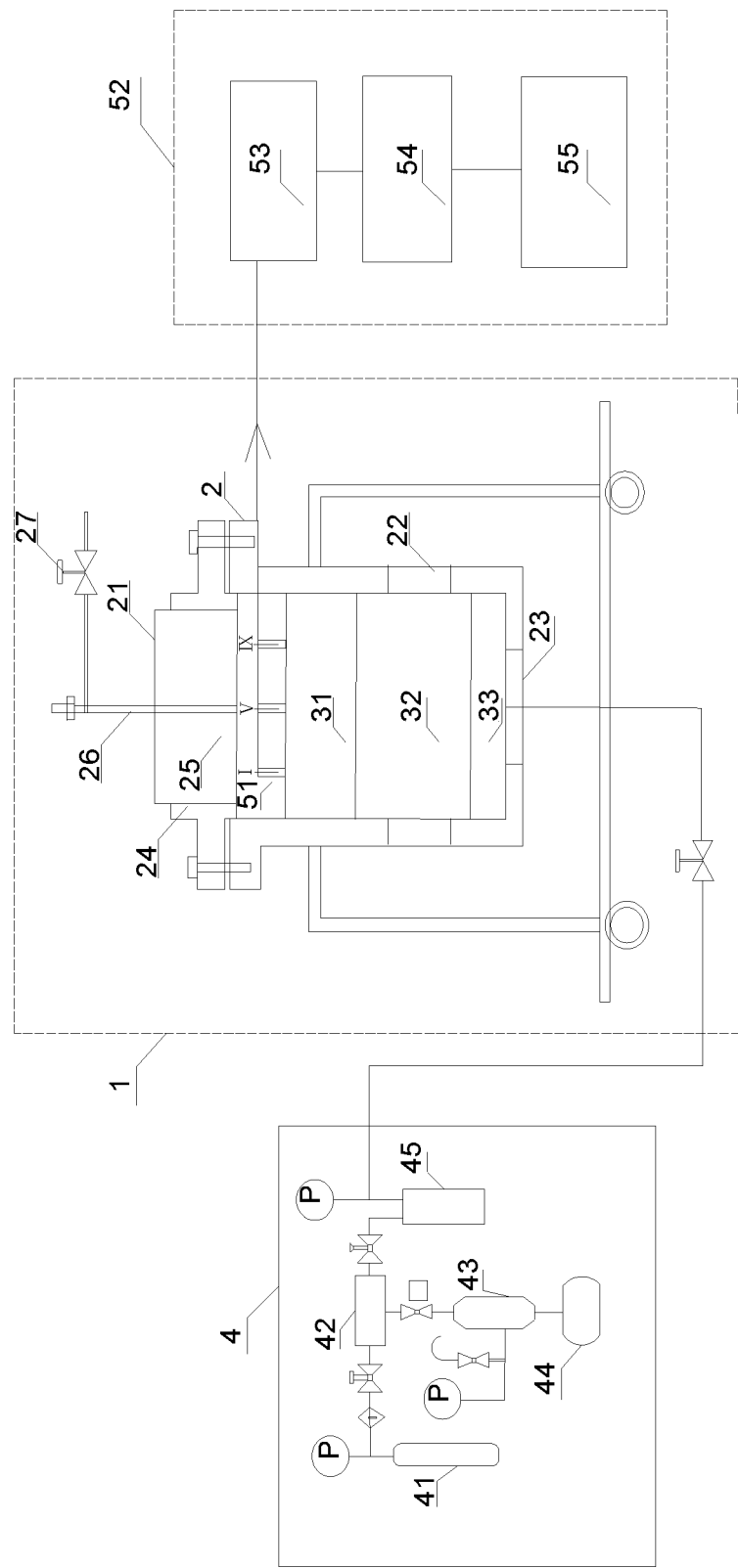
FIG. 1 is a schematic structural diagram of the physical seismic simulation test apparatus based on reflected wave field for a hydrate formation in an embodiment of the present invention.

As shown in FIG. 1, in an embodiment of the present invention, the physical seismic simulation test apparatus based on reflected wave field for a hydrate formation comprises a hydrate preparation device and a reflected acoustic wave test device, wherein the hydrate preparation device comprises a temperature-adjustable cryogenic box 1, a pressure kettle 2, a physical seismic model 3 and a methane gas supply device 4; the pressure kettle 2 is disposed in the cryogenic box 1, the seismic physical model 3 is arranged in the pressure kettle 2, and the methane gas supply device 4 is in communication with the physical seismic model 3.

Specifically, the temperature in the pressure kettle 2 is controlled by the temperature-adjustable cryogenic box 1. The pressure kettle 2 may be opened from the top or bottom, and comprises a top cover 21, a main body part 22, and a bottom cover 23. The top cover 21 comprises a fixed end 24, a piston 25, a piston rod 26 and a valve 27, wherein the piston 25 and the piston rod 26 are connected with and fixed to each other to form an integral component, and a guide rail moving device is provided at the joint with the fixed end 24 of the top cover. The piston 25 can move vertically up and down with respect to the fixed end 24 along the guide rail by a distance of 0-50 mm. When the piston 25 is moved down manually or moved down automatically by means of the gas cylinder connected to the piston rod 26, the volume of the inner cavity of the pressure kettle 2 will be decreased and the pressure in the kettle will be increased; when the piston 25 is moved upward, the volume of the inner cavity of the pressure kettle 2 will be increased and the pressure in the kettle will be decreased. The piston rod 26 is hollow and in communication with the valve 27. If the pressure in the kettle is excessively high and can't be decreased enough by moving up the piston 25 during the simulation test, or when the pressure is to be decreased at the end of the simulation test, the valve 27 may be opened to discharge a certain amount of methane gas. The fixed end 24 is fixed to the main body part 22 by bolts. The physical seismic model 3 enters into the cavity of the kettle through the bottom of the pressure kettle 2. The physical seismic model 3 comprises a top plate 31, a simulated hydrate formation 32 and a bottom reflecting plate 33, wherein the simulated hydrate formation 32 is disposed between the top plate 31 and the bottom reflecting plate 33, and the distance between the top plate 31 and the bottom reflecting plate 33 may be adjusted according to the height of the simulated hydrate formation 32, which is 50-70 mm.

In an embodiment of the physical seismic simulation test apparatus based on reflected wave field for a hydrate formation in the present invention, as shown in FIG. 1, the reflected acoustic wave test device comprises an ultrasonic transducer array 51 and a multi-channel acoustic test device 52; the ultrasonic transducer array 51 is configured integrally with the top cover 21 of the pressure kettle 2 and disposed on the top surface of the physical seismic model 3, and the distance between the ultrasonic transducer array 51 and the physical seismic model 3 is adjustable; each transducer unit of the ultrasonic transducer array is connected in two-way to the multi-channel acoustic test device 52 respectively.

Figure 4:
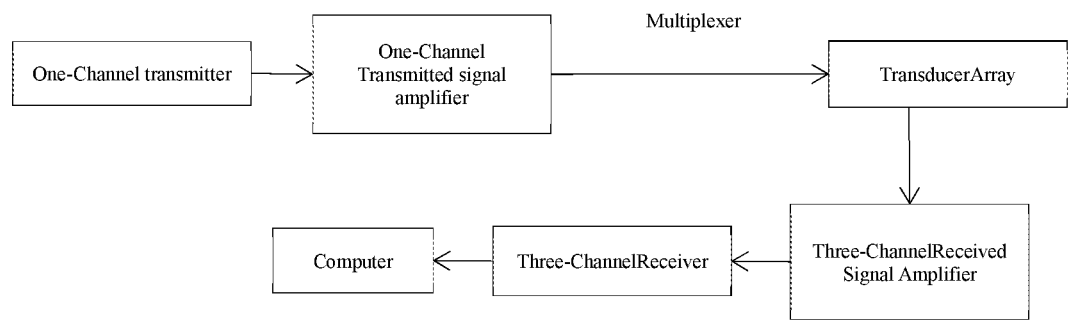
FIG. 4 is a functional block diagram of the multi-channel acoustic test device in the physical seismic simulation test apparatus based on reflected wave field for a hydrate formation in an embodiment of the present invention.

The multi-channel acoustic test device 52 comprises a multi-channel pre-amplifier 53, a multi-channel transceiver 54 and a computer 55, wherein one end of the multi-channel transceiver 54 is electrically connected to the ultrasonic transducer array 51 via the multi-channel pre-amplifier 53, and the other end of the multi-channel transceiver 54 is electrically connected to the computer 55. As shown in FIG. 4, the number of channels of the multi-channel pre-amplifier 53 matches that of the multi-channel transceiver 54. The multi-channel transceiver 54 comprises a transmitter and three receivers, the multi-channel pre-amplifier 53 comprises a transmitted signal amplifier and three received signal amplifiers, the transmitted signal amplifier is connected via a multiplexer to the ultrasonic transducer array, and the output signals from the transmitted signal magnifier are connected to the transducer units sequentially under program control; the signal output side of the transmitter is connected to the transmitted signal amplifier, the ultrasonic signals outputted by the transmitter is amplified by the transmitted signal magnifier and then is emitted; the reflected wave signals detected by every three transducer units are amplified by the three received signal amplifiers respectively simultaneously and received by the three receiver simultaneously, transformed into electrical signals, and then transmitted to the computer. The computer performs signal processing and analysis and parses the physical and chemical characteristics of the physical seismic model 3 from the signals.

Figures 2, 3:
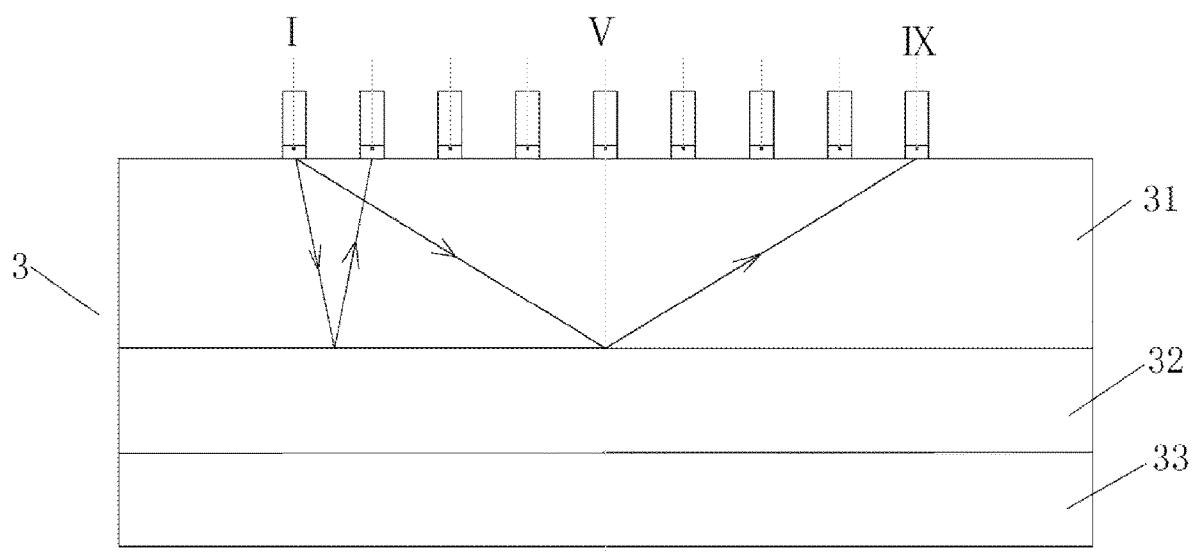
FIG. 2 is a schematic plan view of the ultrasonic transducer array in the physical seismic simulation test apparatus based on reflected wave field for a hydrate formation in an embodiment of the present invention.
FIG. 3 is a schematic diagram of the working principle of the ultrasonic transducer array in FIG. 2.

As shown in FIGS. 2-3, the multi-channel transceiver has a single-input and multi-output working mode, i.e., one transducer in the array transmits while the other 80 transducers receive; and then another transducer transmits while the other 80 transducers receive, until each of the 81 transducers transmits once. A three-channel simultaneous acquisition mode is employed, the transmitted signals are transmitted in one channel, and the received signals are received in three channels sequentially. The units are aligned in nine rows, which are grouped into three sets, with 3 rows (channels) in each set. Whenever the transmitted signals are transmitted in one channel, the detected signals are acquired in 80 channels altogether except the aforesaid channel, starting from the first set, in the sequence of from the column 1 to the column 9, then from the column 1 to the column 9 in the second set, and next from the column 1 to the column 9 in the third set, till the data acquisition is completed.

As shown in FIG. 1, the methane gas supply device 4 comprises a methane cylinder 41, a booster pump 42, a low pressure storage tank 43, a mute air compressor 44, and a high pressure storage tank 45, wherein the methane outputted from the methane cylinder 41 is sent to the high pressure storage tank 45 after being regulated by the booster pump 42, and the methane is filled into the simulated hydrate formation 32 through the bottom cover 23 and the bottom reflecting plate 33 in the pressure kettle 2 sequentially, so that the physical seismic model 3 generates simulated hydrates.

Figure 5:
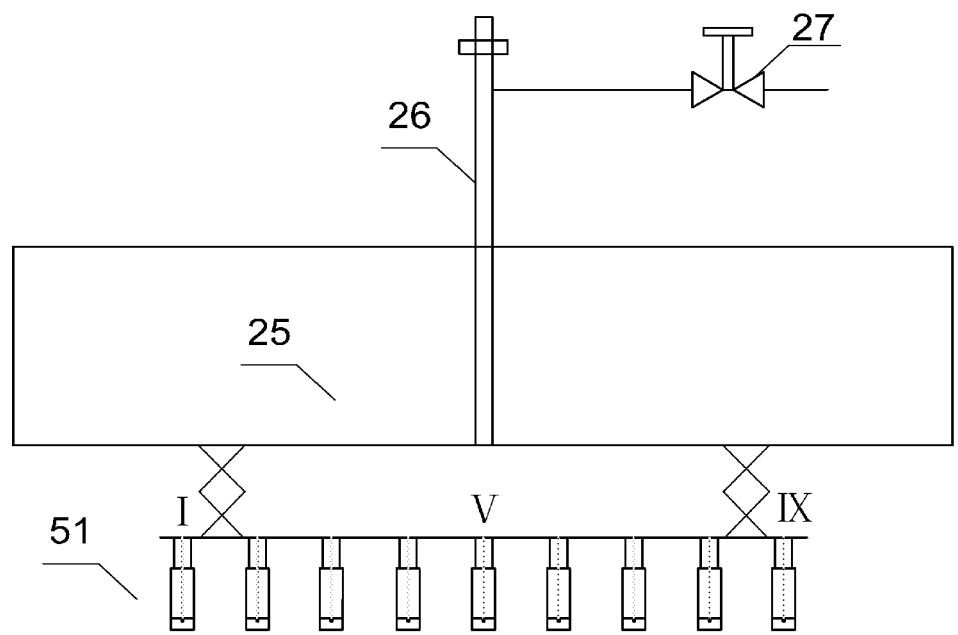
FIG. 5 is a schematic diagram of the connection between the ultrasonic transducer array and the top cover in FIG. 2.

As shown in FIG. 5, the 81 transducer units in the transducer array are fixed together, then the transducer array is fixed to the top cover via a lifting device so that the transducer array can move up and down. In the simulation test, the transducer array is near the top plate 31.

The physical seismic simulation test apparatus based on reflected wave field for a hydrate formation is operated as follows:

1) The entire experimental installation is connected according to FIG. 1, wherein the physical seismic model 3 for simulating the submarine natural gas hydrate generation environment is placed in the pressure kettle 2 through the bottom. The top cover 21 of the pressure kettle with the ultrasonic transducer array 51 installed therein are placed on the main body part 22 of the pressure kettle and fixed, and the bottom cover 23 of the reaction kettle is mounted and fixed.

2) 3.5% NaCl solution is added into the reaction kettle 2 in three times, till the physical seismic model 3 is submerged exactly. Methane gas is charged through the gas inlet to purge the pressure kettle 2 with methane gas for about 3-5 min., so as to expel the air in the pressure kettle.

3) Methane gas is charged into the pressure kettle 2 by means of a methane control device, and the pressure in the pressure kettle 2 is controlled to reach a required high pressure state (6-10 MPa). The temperature in the pressure kettle 2 is regulated by means of the temperature-adjustable cryogenic box 1 to reach a required temperature state (1-4° C.). Thus, simulated hydrates are generated in the physical seismic model 3.

4) The reflected acoustic wave test device is turned on, signals are transmitted by the single-channel transmitter and amplified by the pre-amplifier 53, and the reflected wave signals reflected on the physical seismic model 3 are scanned and received by the multi-channel receiver 54. Altogether 81×80 channels of model data are acquired; specifically, one transmitter transmits, while the other 80 receivers receive; after the receiving is completed, another transmitter transmits, till each of the 81 transmitters transmits once.

5) As the hydrates are generated continuously, reflection characteristic information and acoustic wave velocity change information are identified and extracted from the simulated hydrates, while the degree of saturation of the simulated hydrates is monitored continuously. Thus, the law of variation of the reflection characteristic information and acoustic wave velocity with the degree of saturation of the hydrates is obtained.

Based on the existing field exploration and experiments, the reflection characteristic information is mainly the amplitude information of Bottom Simulating Reflector (BSR), which varies with the degree of saturation (the variation is shown in the following Table 1), and the acoustic wave velocity increases as the degree of saturation increases (the variation is shown in the following Table 2); however, the variations obtained in different experiments are slightly different. Through the experiment, the law of variation of the reflection characteristic information and the acoustic wave velocity of the hydrate formation in the sea area with the degree of saturation can be obtained. Based on the law of variation obtained through the experiment, the degree of saturation may be predicted by using the BSR and acoustic wave velocity in the offshore seismic profile. The apparatus and method have important guiding significance for the interpretation of geophysical exploration signals and estimation of the degree of saturation of gas hydrates in sea areas.

TABLE 1

Variation of the Reflection Characteristics with the Degree of Saturation

| Degree of Saturation of the Hydrates | Law of Variation of the Amplitude of BSR |
| --- | --- |
| <25% | It is difficult to see any apparent reflection amplitude of BSR. |
| 25%-45% | The amplitude of BSR increases as the degree of saturation increases, but the amplitude of BSR is weak in the profile and difficult to ascertain. |
| >45% | The amplitude of BSR increases as the degree of saturation increases, and apparent reflection amplitude of BSR can be seen in the profile. |

TABLE 2

Variation of the Acoustic Wave Velocity with the Degree of Saturation

| Degree of Saturation of the Hydrates | Acoustic Wave Velocity (m/s) | Degree of Saturation of the Hydrates | Acoustic Wave Velocity (m/s) |
| --- | --- | --- | --- |
| 0.00 | 1746.60 | 0.24 | 2178.31 |
| 0.05 | 1786.83 | 0.26 | 2183.28 |
| 0.08 | 1792.40 | 0.29 | 2201.26 |
| 0.11 | 1932.51 | 0.30 | 2254.47 |
| 0.15 | 1921.24 | 0.34 | 2469.12 |
| 0.19 | 1962.32 | 0.44 | 2564.63 |
| 0.20 | 2035.67 | 0.51 | 3458.20 |
| 0.22 | 2156.67 | 0.67 | 3658.19 |

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

The invention claimed is:

1. A physical seismic simulation test apparatus based on reflected wave field for a hydrate formation, comprising a hydrate preparation device and a reflected acoustic wave test device, wherein the hydrate preparation device is configured to generate simulated hydrates, and the reflected acoustic wave test device is configured to continuously emit ultrasonic waves to the simulated hydrates in the generation process, and process the received reflected waves to identify and extract reflection characteristic information and acoustic wave velocity change information, and continuously monitor the degree of saturation of the simulated hydrates at the same time to obtain a corresponding relationship between the reflection characteristic information and acoustic wave velocity change information and the degree of saturation of the simulated hydrates, wherein the hydrate preparation device comprises a temperature-adjustable cryogenic box, a pressure kettle, a physical seismic model and a methane gas supply device; the pressure kettle is disposed in the cryogenic box, the seismic physical model is arranged in the pressure kettle, and the methane gas supply device is in communication with the physical seismic model, and the physical seismic model comprises a top plate, a simulated hydrate formation and a bottom reflecting plate, wherein the simulated hydrate formation is disposed between the top plate and the bottom reflecting plate, and the distance between the top plate and the bottom reflecting plate is adjustable; a gas supply pipe of the methane gas supply device sequentially penetrates through a bottom cover of the pressure kettle and the bottom reflecting plate to charge methane into the simulated hydrate formation.

2. The physical seismic simulation test apparatus based on reflected wave field for a hydrate formation according to claim 1, wherein the reflected acoustic wave test device comprises an ultrasonic transducer array and a multi-channel acoustic test device; the ultrasonic transducer array is configured integrally with the top cover of the pressure kettle and disposed on the top surface of the physical seismic model, and the distance between the ultrasonic transducer array and the physical seismic model is adjustable; each transducer unit of the ultrasonic transducer array is connected in two-way communication to the multi-channel acoustic test device respectively.

3. The physical seismic simulation test apparatus based on reflected wave field for a hydrate formation according to claim 2, wherein the multi-channel acoustic test device comprises a multi-channel pre-amplifier, a multi-channel transceiver and a computer, wherein one end of the multi-channel transceiver is electrically connected to the ultrasonic transducer array via the multi-channel pre-amplifier, and the other end of the multi-channel transceiver is electrically connected to the computer; the multi-channel transceiver has a single-input and multi-output operating mode.

4. The physical seismic simulation test apparatus based on reflected wave field for a hydrate formation according to claim 3, wherein the multi-channel transceiver works in a mode in which it transmits in a single channel and scans and receives in longitudinal and transverse directions sequentially in three channels; accordingly, the ultrasonic transducer array transmits with a single transducer unit in turn, while the other transducer units receive the reflected waves at the same time, wherein among the transducer units that receive the reflected waves, three adjacent transducer units in the same column work as a group to sequentially feed echo signals back to the multi-channel transceiver.

5. The physical seismic simulation test apparatus based on reflected wave field for a hydrate formation according to claim 2, wherein the top cover of the pressure kettle is adapted to be adjusted up and down by means of a piston.

6. The physical seismic simulation test apparatus based on reflected wave field for a hydrate formation according to claim 1, wherein the methane gas supply device comprises a methane cylinder and a booster pump, and the methane outputted by the methane cylinder is sent to the physical seismic model after being regulated by the booster pump.

* * * * *